(12) United States Patent
Wang et al.

(10) Patent No.: US 10,147,444 B2
(45) Date of Patent: Dec. 4, 2018

(54) ELECTRONIC APPARATUS AND VOICE TRIGGER METHOD THEREFOR

(71) Applicant: Airoha Technology Corp., Hsinchu (TW)

(72) Inventors: Chien-Chieh Wang, Hsinchu County (TW); Heng-Chih Lin, Hsinchu (TW)

(73) Assignee: AIROHA TECHNOLOGY CORP., Hsinchu (TW)

( * ) Notice: Subject to any disclaimer, the term of this patent is extended or adjusted under 35 U.S.C. 154(b) by 9 days.

(21) Appl. No.: 15/215,670

(22) Filed: Jul. 21, 2016

(65) Prior Publication Data

US 2017/0125036 A1    May 4, 2017

Related U.S. Application Data

(60) Provisional application No. 62/249,973, filed on Nov. 3, 2015.

(30) Foreign Application Priority Data

Apr. 28, 2016 (TW) .............................. 105113280 A

(51) Int. Cl.
*G10L 15/22* (2006.01)
*G10L 25/78* (2013.01)
(Continued)

(52) U.S. Cl.
CPC ............ *G10L 25/78* (2013.01); *G10L 15/063* (2013.01); *G10L 17/02* (2013.01); *G10L 17/22* (2013.01);
(Continued)

(58) Field of Classification Search
CPC ....... G10L 15/22; G10L 15/065; G10L 15/20; G10L 2015/223; G10L 2015/088
See application file for complete search history.

(56) References Cited

U.S. PATENT DOCUMENTS 5,488,652 A * 1/1996 Bielby .................. G10L 15/063
379/213.01
6,188,986 B1 2/2001 Matulich et al.
(Continued)

FOREIGN PATENT DOCUMENTS

TW    201502872 A    1/2015
TW    201535157 A    9/2015

OTHER PUBLICATIONS

TIPO Office Action dated Sep. 4, 2017 in corresponding Taiwan application (No. 105113280).

*Primary Examiner* — Jialong He
(74) *Attorney, Agent, or Firm* — McClure, Qualey & Rodack, LLP

(57) ABSTRACT

A voice trigger method for an electronic apparatus is provided. The voice trigger method includes the following steps. Receive a current voice signal. Extract a current voice feature from the current voice signal. Determine whether a previous voice feature of a previous voice signal is stored. When the previous voice feature is stored, at least one of adjusting a confidence threshold and determining whether to wake up the electronic apparatus is performed according to whether the previous voice feature is corresponding to a false acceptance situation or a false rejection situation and the similarity between the current voice feature and the previous voice feature.

10 Claims, 12 Drawing Sheets

(51) Int. Cl.
  *G10L 17/02* (2013.01)
  *G10L 17/22* (2013.01)
  *G10L 15/06* (2013.01)
  *G10L 15/08* (2006.01)

(52) U.S. Cl.
  CPC ............... *G10L 2015/0638* (2013.01); *G10L 2015/088* (2013.01); *G10L 2025/786* (2013.01)

(56) References Cited

U.S. PATENT DOCUMENTS

| | | | |
|---|---|---|---|
| 7,657,433 B1* | 2/2010 | Chang | G10L 15/08 704/236 |
| 7,774,204 B2 | 8/2010 | Mozer et al. | |
| 8,775,191 B1 | 7/2014 | Sharifi et al. | |
| 8,996,381 B2 | 3/2015 | Mozer et al. | |
| 9,043,211 B2 | 5/2015 | Haiut et al. | |
| 9,335,966 B2* | 5/2016 | Bansal | G06F 3/167 |
| 2005/0080627 A1* | 4/2005 | Hennebert | G10L 15/22 704/270 |
| 2005/0149319 A1* | 7/2005 | Honda | G10L 15/075 704/9 |
| 2006/0074658 A1 | 4/2006 | Chadha | |
| 2006/0200347 A1* | 9/2006 | Kim | G10L 15/22 704/236 |
| 2006/0265223 A1* | 11/2006 | Doyle | G10L 15/20 704/240 |
| 2006/0293886 A1* | 12/2006 | Odell | G10L 15/08 704/231 |
| 2007/0192095 A1* | 8/2007 | Braho | G10L 15/01 704/232 |
| 2010/0179811 A1* | 7/2010 | Gupta | G10L 15/22 704/235 |
| 2013/0138439 A1* | 5/2013 | Marcus | G10L 15/22 704/240 |
| 2014/0222436 A1 | 8/2014 | Binder et al. | |
| 2014/0244253 A1 | 8/2014 | Bringert et al. | |
| 2014/0257812 A1 | 9/2014 | Mozer | |
| 2015/0106085 A1 | 4/2015 | Lindahl | |
| 2015/0133109 A1 | 5/2015 | Freeman et al. | |
| 2015/0134331 A1 | 5/2015 | Millet et al. | |
| 2015/0161370 A1* | 6/2015 | North | G07C 9/00158 726/5 |
| 2016/0077794 A1* | 3/2016 | Kim | G06F 3/167 704/275 |
| 2016/0358603 A1 | 12/2016 | Azam et al. | |

* cited by examiner

ELECTRONIC APPARATUS AND VOICE TRIGGER METHOD THEREFOR

This application claims the benefits of U.S. provisional application Ser. No. 62/249,973, filed Nov. 3, 2015, and Taiwan application Serial No. 105113280, filed Apr. 28, 2016, the subject matters of which are incorporated herein by reference.

BACKGROUND OF THE INVENTION

Field of the Invention

The invention relates in general to an electronic apparatus and a trigger method therefor, and more particularly to an electronic apparatus and a voice trigger method therefor.

Description of the Related Art

In recent years, due to the advance in technology, the user can control an electronic apparatus using voice. For example, the user can wake up an electronic apparatus using voice. However, under the influence of various factors, situations of false acceptance or false rejection still may occur. False acceptance refers to the situation that the electronic apparatus is woken up unexpectedly. False rejection refers to the situation that the user wants to wake up an electronic apparatus using voice but the electronic apparatus cannot be woken up successfully. For example, the electronic apparatus may be woken up by ambient noises under unexpected circumstances. Or, when the user is talking with someone else, the user's voice wakes up an electronic apparatus unexpectedly. Or, the user's voice cannot successfully wake up an electronic apparatus due to his/her accent. In general, to resolve the above problems, the key phrase voice model must be on-line adapted or must be pre-trained for specific users. However, the on-line adaptation or pre-training of the key phrase voice model is too complicated and does not meet the cost considerations. Furthermore, if error occurs during the adaptation or pre-training of the key phrase voice model, the key phrase voice model may fail and cannot be used. Therefore, how to resolve the events of false acceptance and false rejection and increase the probability of successfully waking up the electronic apparatus has become a prominent task for the industries.

SUMMARY OF THE INVENTION

The invention is directed to an electronic apparatus and a voice trigger method therefor, wherein the method is capable of adjusting the accuracy of waking up an electronic apparatus using voice trigger.

According to a first aspect of the present invention, a method for waking up an electronic apparatus using voice trigger is provided. The method includes following steps. A current voice signal is received. A current voice feature of the current voice signal is extracted. Whether a previous voice feature of a previous voice signal is stored is determined. When it is determined that the previous voice signal is stored, at least one of adjusting a confidence threshold and determining whether to wake up the electronic apparatus is performed according to a degree of similarity between the current voice feature and the previous voice feature and a false acceptance situation or a false rejection situation corresponding to the previous voice feature.

According to a second aspect of the present invention, an electronic apparatus is provided. The electronic apparatus includes a storage device, a voice receiver and a processor. The voice receiver receives a current voice signal. The processor extracts a current voice feature of the current voice signal and determines whether a previous voice feature of a previous voice signal is stored in the storage device. If it is determined that the previous voice signal is stored in the storage device, the processor performs at least one of adjusting a confidence threshold and determining whether to wake up the electronic apparatus according to a degree of similarity between the voice feature and the previous voice feature and a false acceptance situation or a false rejection situation corresponding to the previous voice feature.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
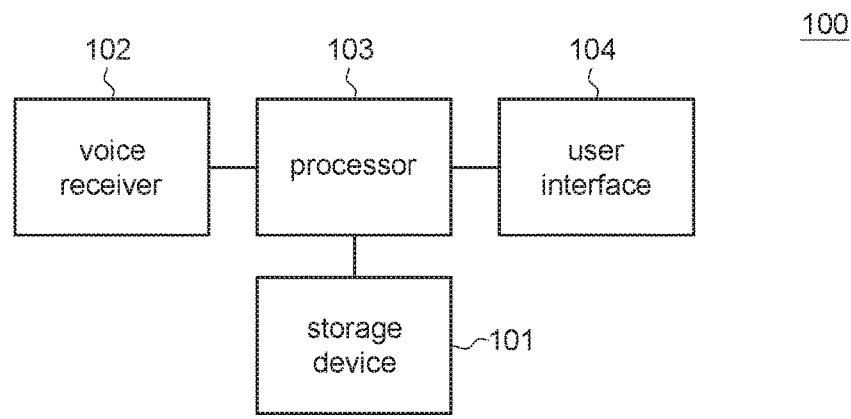
FIG. 1 is a block diagram of an electronic apparatus according to an embodiment of the invention.

Referring to FIG. 1, a block diagram of an electronic apparatus 100 according to an embodiment of the invention is shown. The electronic apparatus 100 includes a storage device 101, a voice receiver 102, and a processor 103 and selectively includes a user interface 104. The storage device 101 stores data and can be realized by such as a memory. The voice receiver 102 receives a voice, and further converts an analog voice signal into a digital voice signal. The storage device 101 and the voice receiver 102 are coupled to the processor 103. The processor 103 receives the digital voice signal outputted from the voice receiver 102, extracts a voice feature of the digital voice signal, accesses the storage device 101 and manages the data stored in the storage device 101. The user interface 104 receives a user's input and provides output information. The user interface 104 can be realized by a touch panel.

Figure 2:
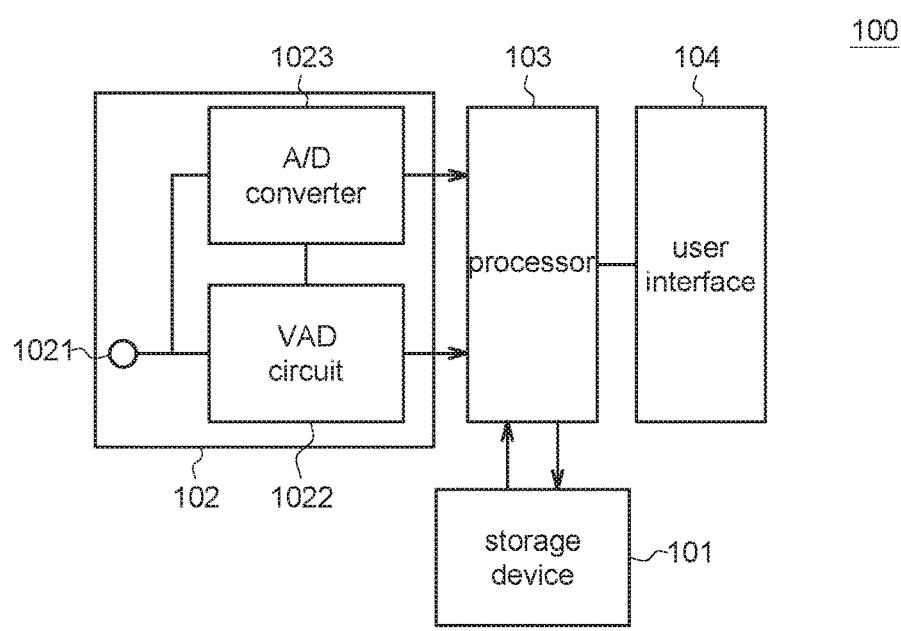
FIG. 2 is a block diagram of an electronic apparatus according to another embodiment of the invention.

Referring to FIG. 2, a block diagram of an electronic apparatus 100 according to another embodiment of the invention is shown. In the present embodiment, the voice receiver 102 can be realized by a microphone 1021, a voice activity detection (VAD) circuit 1022 and an analog to digital (A/D) converter 1023. The microphone 1021 receives a voice. The analog to digital converter 1023 converts an analog voice signal into a digital voice signal. The voice activity detection circuit 1022 detects a voice and further transmits a signal to the processor 103 when the voice is detected. For example, when the voice activity detection circuit 1022 detects a voice, the voice activity detection circuit 1022 transmits a signal (such as an interrupt signal) to the processor 103 to wake up or inform the processor 103, such that the processor 103 can process the digital voice signal outputted from the analog to digital converter 1023.

Figure 3:
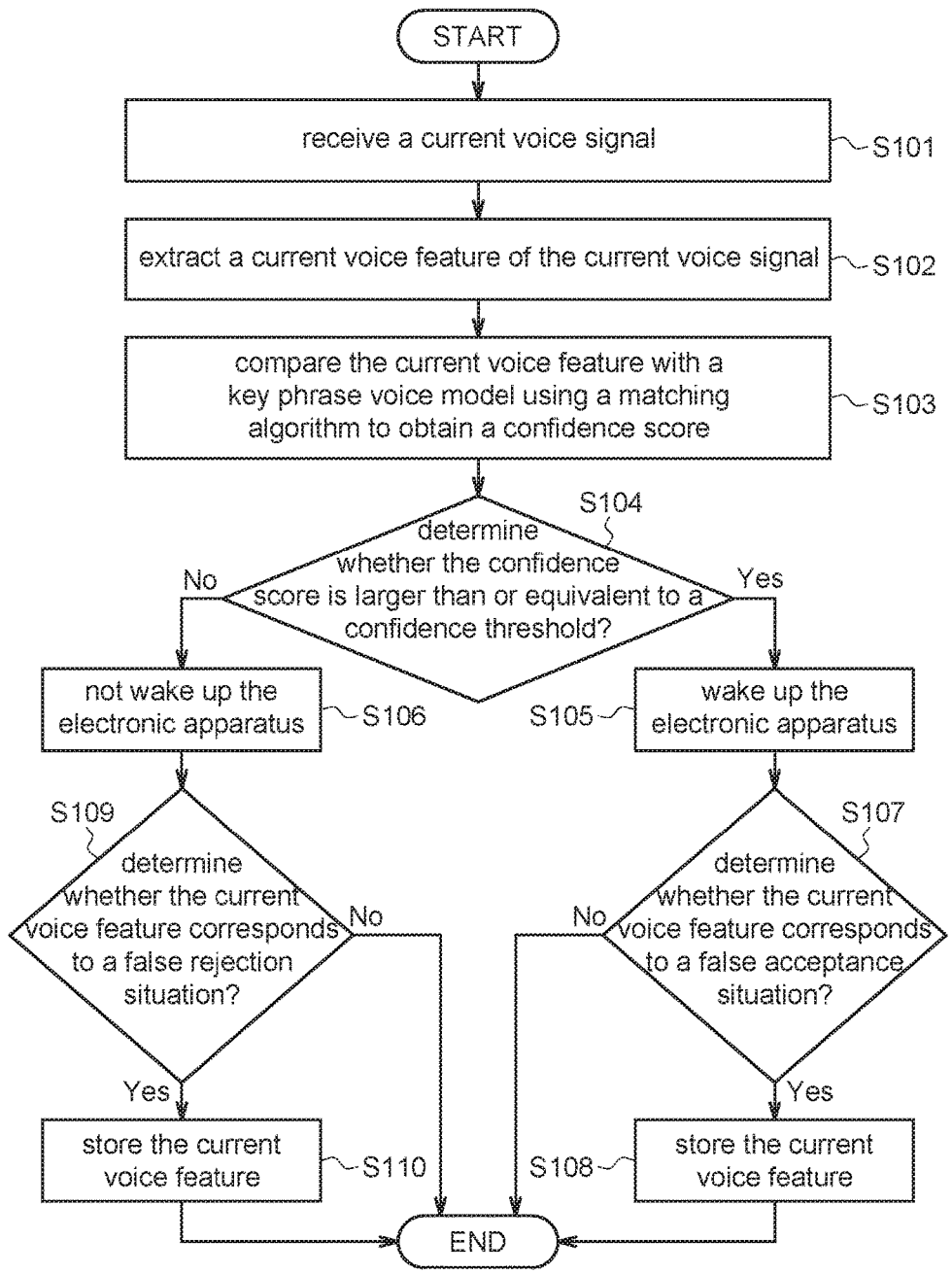
FIG. 3 is a flowchart of a method for waking up an electronic apparatus using voice trigger according to an embodiment of the invention.

Referring to FIGS. 1 and 3. FIG. 3 is a flowchart of a method for waking up an electronic apparatus 100 using voice trigger according to an embodiment of the invention. In the present embodiment, the processor 103 can determine whether the current voice feature of the current voice signal corresponds to a false acceptance situation or a false rejection situation. If it is determined that the current voice feature corresponds to the false acceptance situation or the false rejection situation, the current voice feature is stored for future use.

In step S101, the voice receiver 102 receives a current voice signal. The current voice signal is obtained from the user's current talking voice. In step S102, the processor 103 extracts a current voice feature of the current voice signal.

In step S103, the processor 103 compares the current voice feature with a key phrase voice model using a matching algorithm to obtain a confidence score. That is, the processor 103 compares the similarity between the current voice feature and the key phrase of the key phrase voice model to obtain a confidence score and further determines whether the current voice feature can wake up the electronic apparatus 100 according to the confidence score. If the similarity between the current voice feature and the key phrase of the key phrase voice model is high, then the confidence score will also be high. This indicates that the user's speech content is the same or very similar with the key phrase of the key phrase voice model, and the user can wake up the electronic apparatus 100 using his/her voice. If the similarity between the current voice feature and the key phrase of the key phrase voice model is low, the confidence score will also be low. This indicates that the user's speech content is very different from the key phrase of the key phrase voice model, and it can be concluded that the user does not really want to wake up the electronic apparatus 100 using his/her voice.

Figure 4:
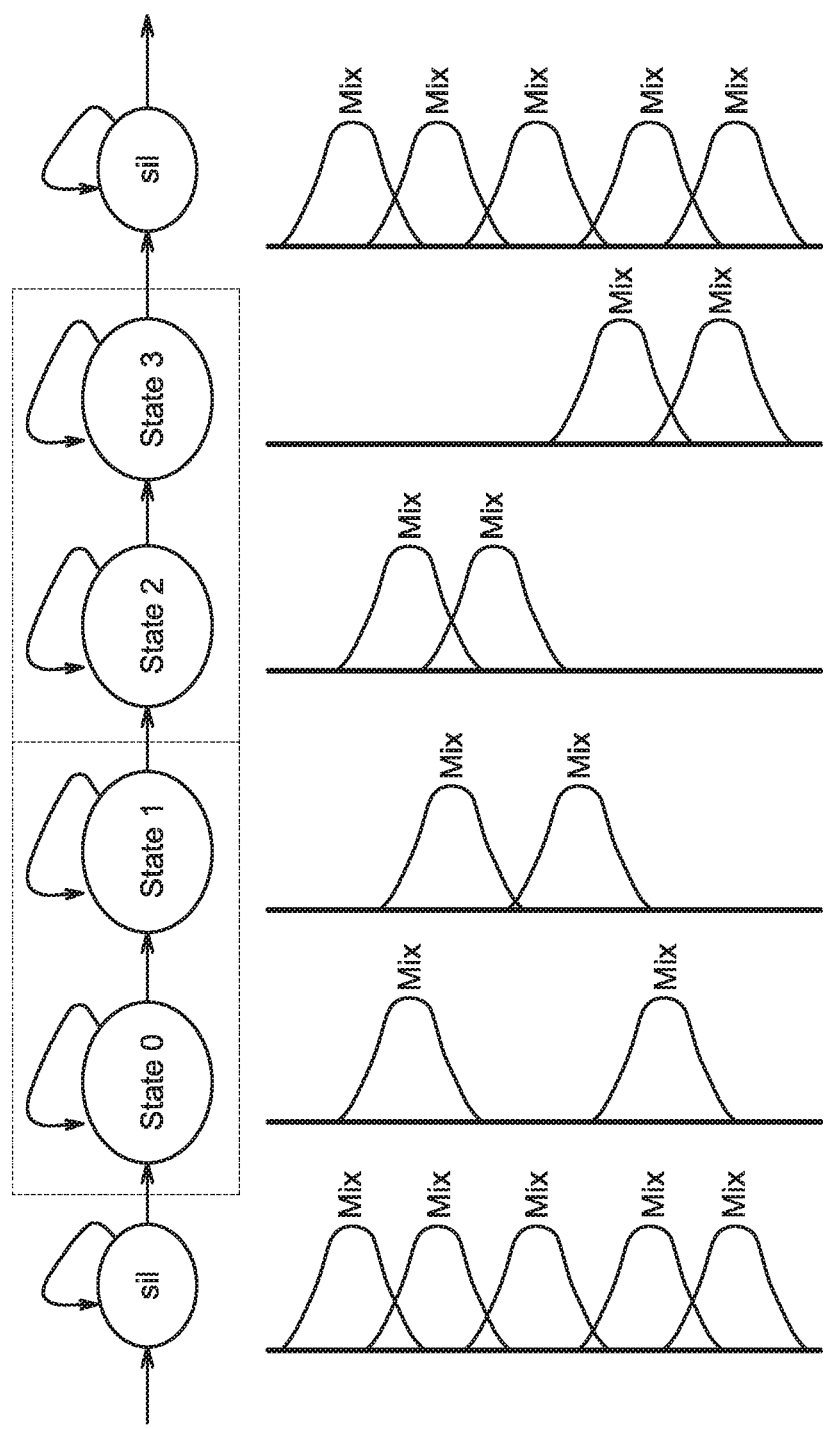
FIG. 4 is a schematically diagram of an example of a key phrase voice model.
Figure 5:
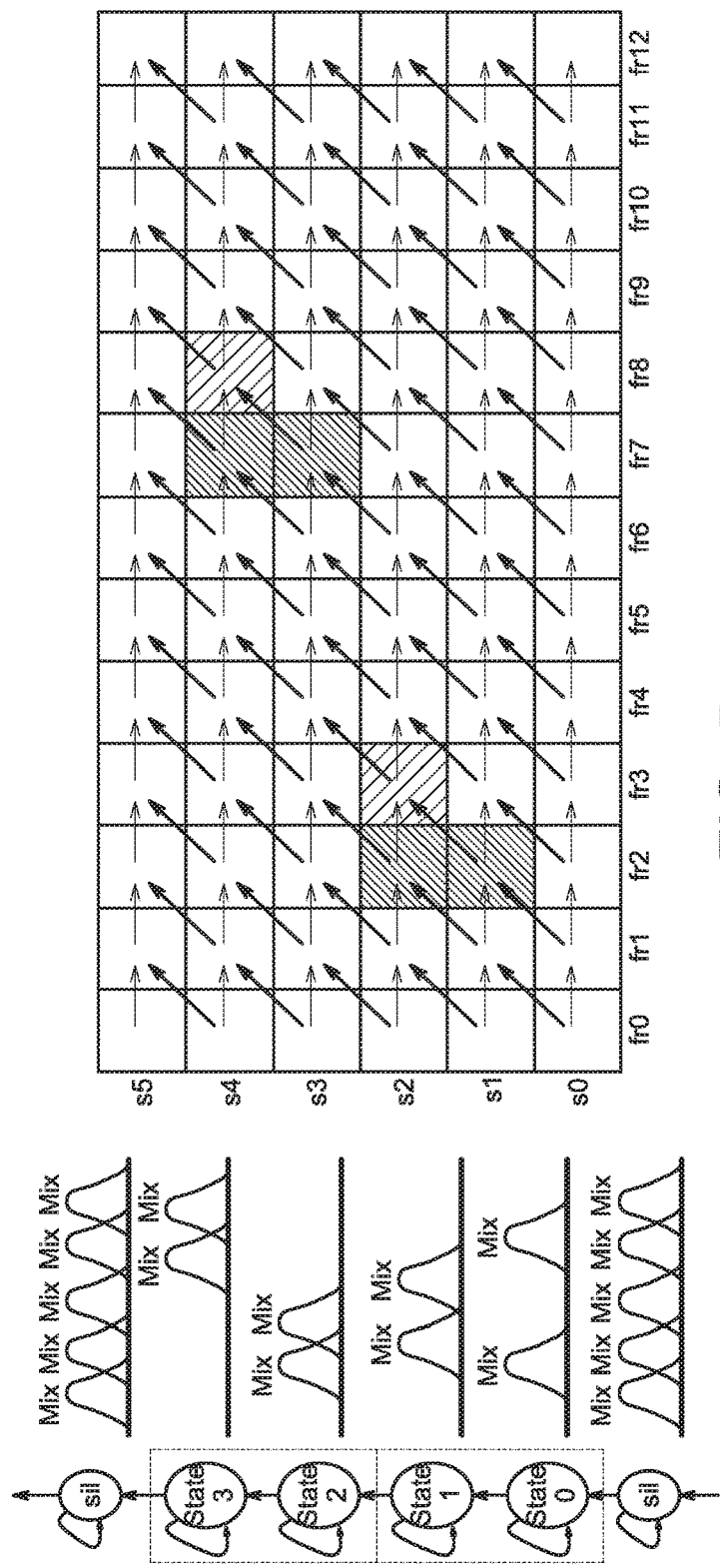
FIG. 5 is a schematically diagram of the Viterbi algorithm.

In an embodiment, the matching algorithm can be the Viterbi algorithm. Referring to FIGS. 4 and 5. FIG. 4 is a schematically diagram of an example of a key phrase voice model. FIG. 5 is a schematically diagram of the Viterbi algorithm. The key phrase voice model includes 6 states: sil, State 0, State 1, State 2, State 3 and sil. The arrow illustrated in each state represents state transition, and each state transition includes a transition probability (not illustrate). As indicated in FIG. 5, the horizontal axis represents frames fr0—fr12 of the current voice, the vertical axis represents states s0—s5, respectively corresponding to the 6 states sil, State 0, State 1, State 2, State 3 and sil of the key phrase voice model. The processor 103 can find an optimum path using the Viterbi algorithm to maximize the score of the entire path. The sum of the score in each cell of the shortest path is the confidence score. In another embodiment, the matching algorithm can be any algorithm capable of calculating the similarity between the current voice feature and the key phrase of the key phrase voice model.

After the confidence score is obtained, the method proceeds to step S104, the processor 103 determines whether the confidence score is larger than or equivalent to a confidence threshold. The confidence threshold represents the degree of difficulty with which the current voice feature can wake up the electronic apparatus 100. A low confidence threshold indicates that for the electronic apparatus 100 to be woken up, the similarity between the current voice feature and the key phrase of the key phrase voice model does not need to be high, and the electronic apparatus 100 can be woken up easily using the current voice feature. A high confidence threshold indicates that for the electronic apparatus 100 to be woken up, the similarity between the current voice feature and the key phrase of the key phrase voice model needs to be high, and the electronic apparatus 100 cannot be woken up easily using the current voice feature.

If it is determined that the confidence score is larger than or equivalent to the confidence threshold, then the method proceeds to step S105. If it is determined that the confidence score is smaller than the confidence threshold, then the method proceeds to step S106. In step S105, the processor 103 wakes up the electronic apparatus 100. After the electronic apparatus 100 is woken up, the user can operate the electronic apparatus 100 using various operation methods. For example, the user can operate the electronic apparatus 100 using his/her voice. In another embodiment, the user can operate the electronic apparatus 100 using a keypad or a user interface 104 provided by the electronic apparatus 100. For example, the user can operate the electronic apparatus 100 by touching a touch screen. In step S106, the processor 103 does not wake up the electronic apparatus 100.

After the processor 103 determines that the confidence score is larger than or equivalent to the confidence threshold and accordingly wakes up the electronic apparatus 100 (that is, after steps S104 and S105), then the method proceeds to step S107. In step S107, the processor 103 determines whether the current voice feature corresponds to the false acceptance situation. False acceptance refers to the situation that the electronic apparatus 100 is woken up unexpectedly. The determination method includes: determining whether the user turns off the woken electronic apparatus 100 within a specific time after the electronic apparatus 100 is woken up by the current voice feature. Suppose the user turns off the woken electronic apparatus 100 within a specific time after the electronic apparatus 100 is woken up by the current voice feature. Such situation indicates that the user does not want to wake up the electronic apparatus 100 but the electronic apparatus 100 is woken up by the current voice feature. Thus, it can be determined that the false acceptance situation occurs. Then, the method proceeds to step S108, the processor 103 stores the current voice feature to the storage device 101 and records that the current voice feature corresponds to the false acceptance situation.

After the processor 103 determines that the confidence score is smaller than the confidence threshold but does not wake up the electronic apparatus 100 (that is, after steps S104 and S106), then the method proceeds to step S109. In step S109, the processor 103 determines whether the current voice feature corresponds to the false rejection situation. False rejection refers to the situation that the user wants to wake up the electronic apparatus 100 using voice but the electronic apparatus cannot be woken up successfully. The determination method includes: determining whether the confidence score obtained from the comparison between the current voice feature and the key phrase voice model is smaller than a confidence threshold and whether the difference between the confidence score and the confidence threshold is within a predetermined range if the electronic apparatus 100 cannot be woken up by the current voice feature successfully. Under such circumstances, since the confidence score is smaller than the confidence threshold and the difference between the confidence score and the confidence threshold is within a predetermined range (that is, the confidence score is very close to the confidence threshold). Such situation indicates that the user wants to wake up the electronic apparatus 100, but the electronic apparatus 100 is not woken by the current voice feature. Thus, it can be determined that the false rejection situation occurs. Then, the method proceeds to step S110, the processor 103 stores the current voice feature to the storage device 101 and records that the current voice feature corresponds to the false rejection situation.

Figure 6A:
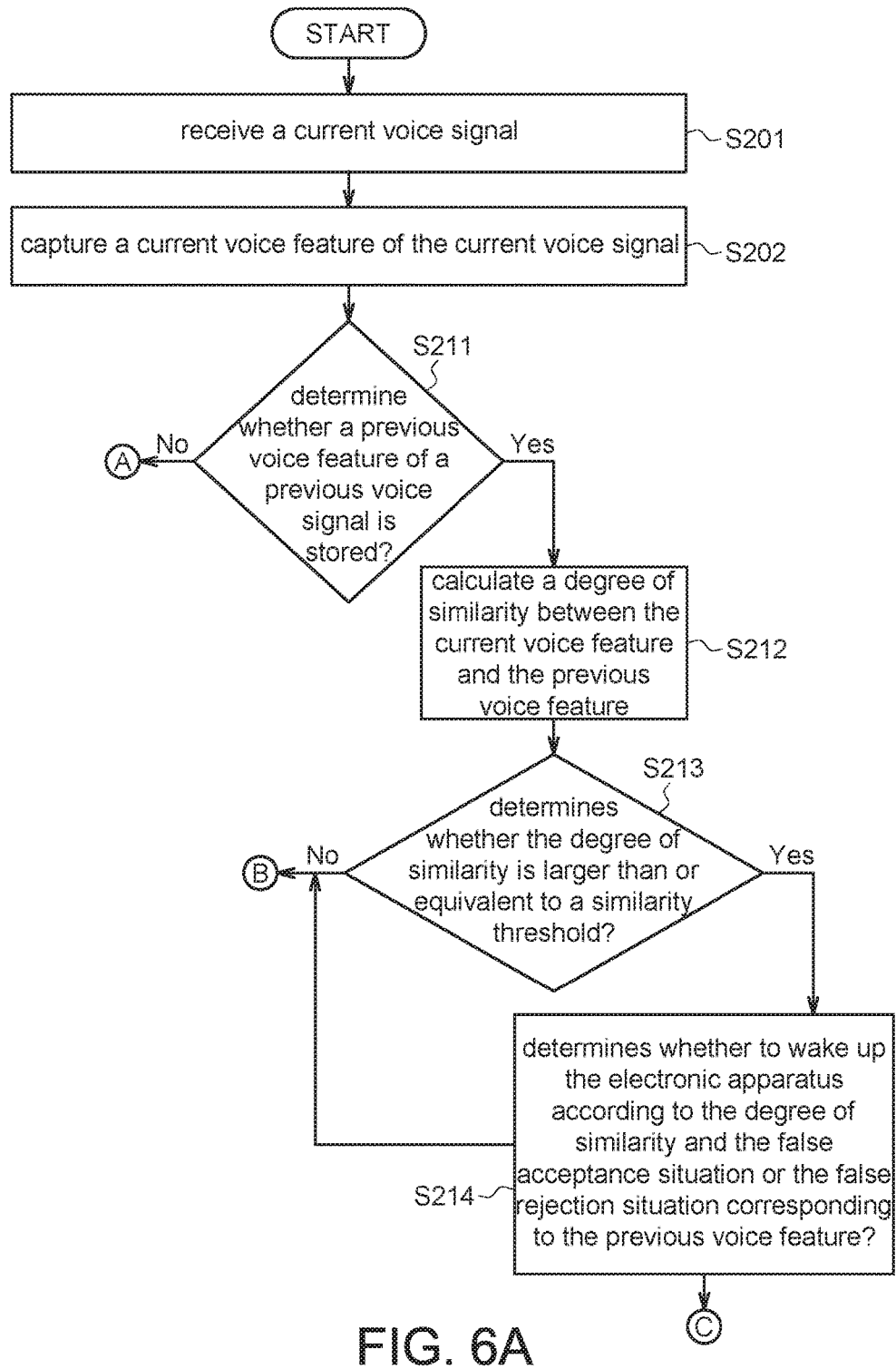
FIGS. 6A and 6B show a flowchart of a method for waking up an electronic apparatus using voice trigger according to another embodiment of the invention.
Figure 6B:
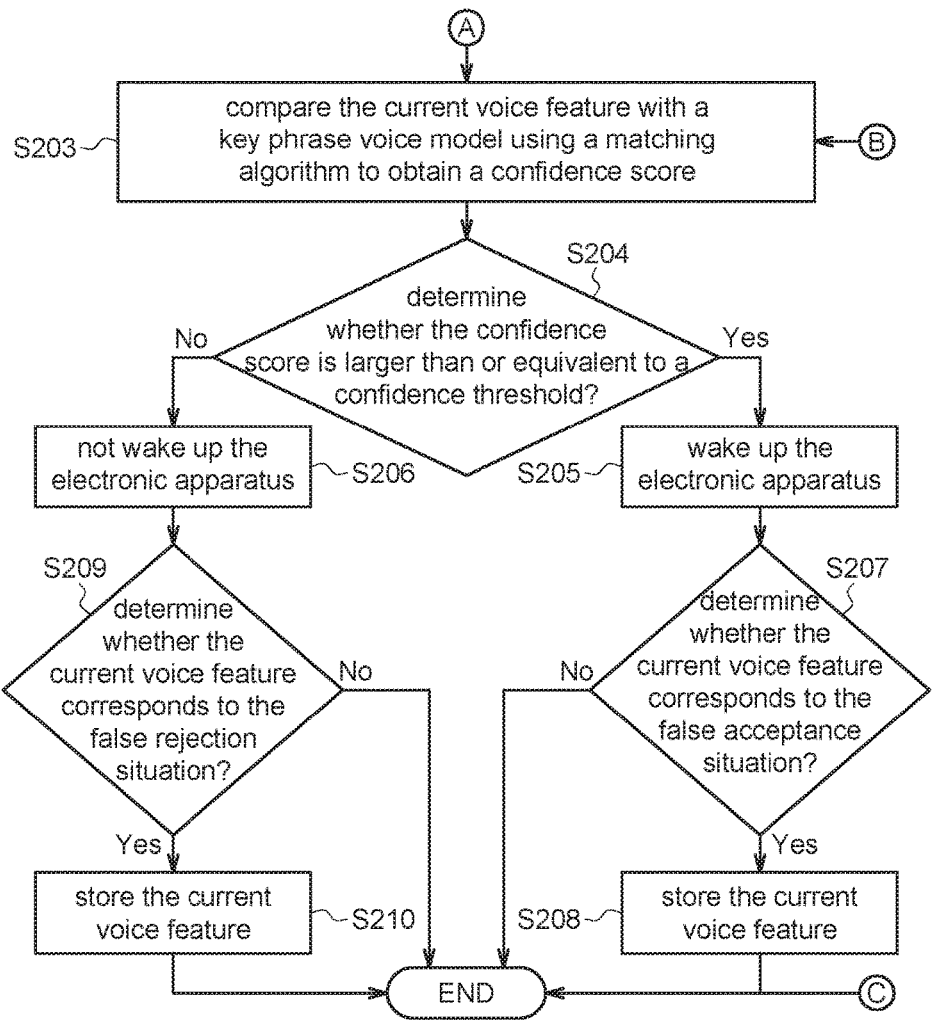

Refer to FIGS. 1, 3, 6A and 6B. FIGS. 6A and 6B show a flowchart of a method for waking up an electronic apparatus 100 using voice trigger according to another embodiment of the invention. In the present embodiment, the processor 103 further determines whether a previous voice feature of a previous voice signal is stored in the storage device 101, and further determines whether to wake up the electronic apparatus 100 according to the previous voice feature and the current voice feature if the previous voice signal is stored in the storage device 101.

After the voice receiver 102 receives a current voice signal and the processor 103 extracts a current voice feature of the current voice signal (that is, after steps S201 and S202), then the method proceeds to step S211.

In step S211, the processor 103 determines whether a previous voice feature of a previous voice signal is stored in the storage device 101. If it is determined that the previous voice signal is stored in the storage device 101, then the method proceeds to step S212. If it is determined that the previous voice signal is not stored in the storage device 101, then the method proceeds to step S203.

Figure 7:
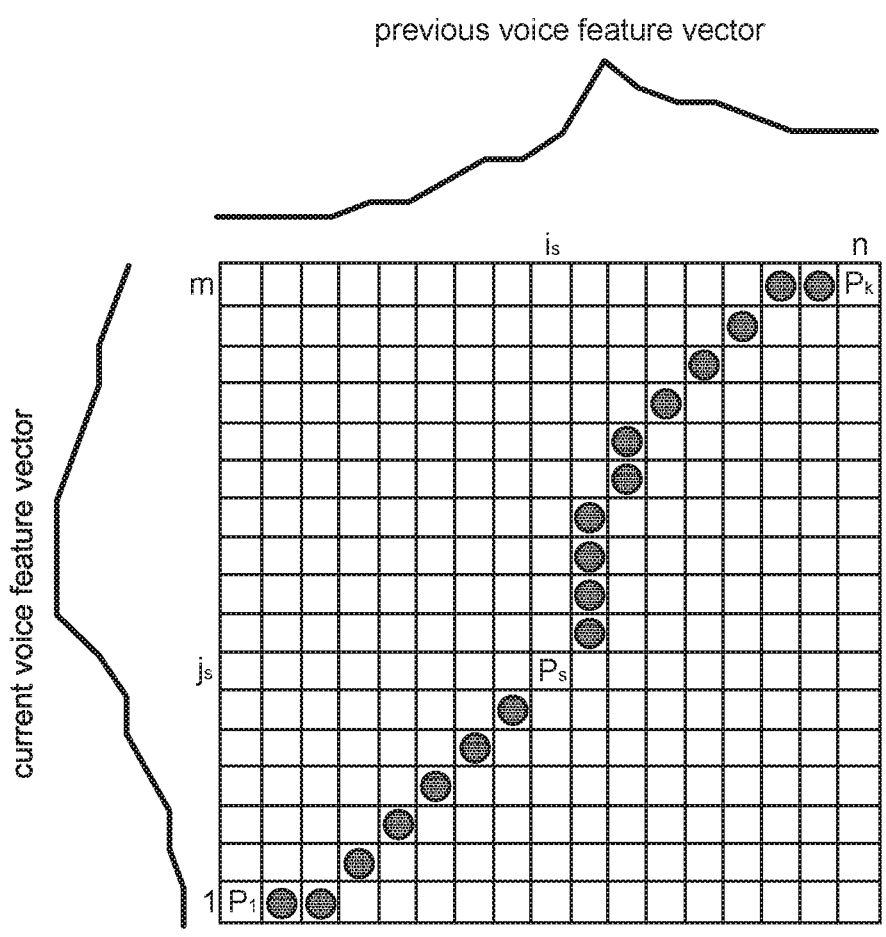
FIG. 7 is a schematically diagram of the DTW algorithm.

In step S212, the processor 103 calculates a degree of similarity between the current voice feature and the previous voice feature. That is, since the previous voice signal is stored in the storage device 101, the processor 103 determines whether to wake up the electronic apparatus 100 according to the previous voice feature and the current voice feature. In an embodiment, the processor 103 calculates a degree of similarity between the previous voice feature and the current voice feature using the dynamic time warping (DTW) algorithm. Referring to FIG. 7, a schematically diagram of the DTW algorithm is shown. As indicated in FIG. 7, $P=P_1, \ldots, P_s, \ldots, P_k, P_s=(i_s,j_s)$, wherein P represents the warping function. The processor 103 can calculate a shortest distance between the current voice feature vector and the previous voice feature vector using the DTW algorithm, and the shortest distance is the degree of similarity. In another embodiment, the processor 103 can calculate a degree of similarity between the previous voice feature and the current voice feature using any algorithm capable of calculating the degree of similarity between two voice features, and the algorithm is not subject to specific restrictions.

After the degree of similarity is calculated, the method proceeds to step S213. In step S213, the processor 103 determines whether the degree of similarity between the current voice feature and the previous voice feature is larger than or equivalent to a similarity threshold. If it is determined that the degree of similarity is larger than or equivalent to the similarity threshold, this indicates that the degree of similarity between the current voice feature and the previous voice feature is high. That is, the degree of similarity between the user's current speech content and previous speech content is high. If it is determined that the degree of similarity is smaller than the similarity threshold, this indicates that the degree of similarity between the current voice feature and the previous voice feature is low. That is, the degree of similarity between the user's current speech content and previous speech content is low. If it is determined that the degree of similarity is larger than or equivalent to the similarity threshold, then the method proceeds to step S214. If it is determined that the degree of similarity is smaller than the similarity threshold, then the method proceeds to step S203.

In step S214, the processor 103 determines whether to wake up the electronic apparatus 100 according to the false acceptance situation or false rejection situation corresponding to the previous voice feature and the degree of similarity. That is, due to the high degree of similarity between the current voice feature and the previous voice feature, the processor 103 determines whether to wake up the electronic apparatus 100 according to the previous voice feature.

If it is determined that the previous voice feature corresponds to the false acceptance situation and the degree of similarity between the current voice feature and the previous voice feature is larger than or equivalent to the similarity threshold (that is, the degree of similarity between the current voice feature and the previous voice feature is high), then the processor 103 does not wake up the electronic apparatus 100. If it is determined that the previous voice feature corresponds to the false acceptance situation, this indicates that the user's previous speech content does not really want to wake up the electronic apparatus 100 but the electronic apparatus 100 is accidentally woken up. If it is determined that the previous voice feature corresponds to the false acceptance situation and the user's current speech content is very similar to his/her previous speech content, then the processor 103 can determine that the user currently does not want to wake up the electronic apparatus 100, and therefore does not wake up the electronic apparatus 100.

If it is determined the previous voice feature corresponds to the false rejection situation and the degree of similarity between the current voice feature and the previous voice feature is larger than or equivalent to the similarity threshold (that is, the degree of similarity between the current voice feature and the previous voice feature is high), then the processor 103 wakes up the electronic apparatus 100. If the previous voice feature corresponds to the false rejection situation, this indicates that the user's previous speech content really wants to wake up the electronic apparatus 100, but the electronic apparatus 100 cannot be woken up successfully. If it is determined that the previous voice feature corresponds to the false rejection situation and the user's current speech content is similar to his/her previous speech content, then the processor 103 can determine that the user currently wants to wake up the electronic apparatus 100, and therefore wakes up the electronic apparatus 100.

In step S203, since the previous voice signal is not stored in the storage device 101 or the degree of similarity between the current voice feature and the previous voice feature is smaller than the similarity threshold, the processor 103 determines whether to wake up the electronic apparatus 100 according to the current voice feature and key phrase voice model rather than the previous voice feature and the current voice feature. The processes by which the processor 103 determines whether to wake up the electronic apparatus 100 according to the current voice feature and the key phrase voice model are disclosed below. In step S203, the processor 103 compares the current voice feature with the key phrase voice model to obtain a confidence score using a matching algorithm. Then, the method proceeds to step S204. The processor 103 determines whether to wake up the electronic apparatus 100 (step S205) or not to wake up the electronic apparatus 100 (step S206) according to whether the confidence score is larger than or equivalent to a confidence threshold (step S204). The processor 103 further determines whether the current voice feature corresponds to the false acceptance situation (step S207) or the false rejection situation (step S209). If it is determined that the current voice feature corresponds to the false acceptance situation or the false rejection situation, then the current voice feature is stored (step S208 or step S210).

Thus, if the previous voice signal is stored in the storage device 101, the processor 103 can determine whether to wake up the electronic apparatus 100 (steps S211—S214) according to the previous voice feature and the situation corresponding to the previous voice feature and the degree of similarity between the current voice feature without comparing the current voice feature with the key phrase voice model (step S203). Thus, the amount of computation can be decreased, and the efficiency and accuracy of waking up the electronic apparatus 100 using voice can be increased.

Figure 8A:
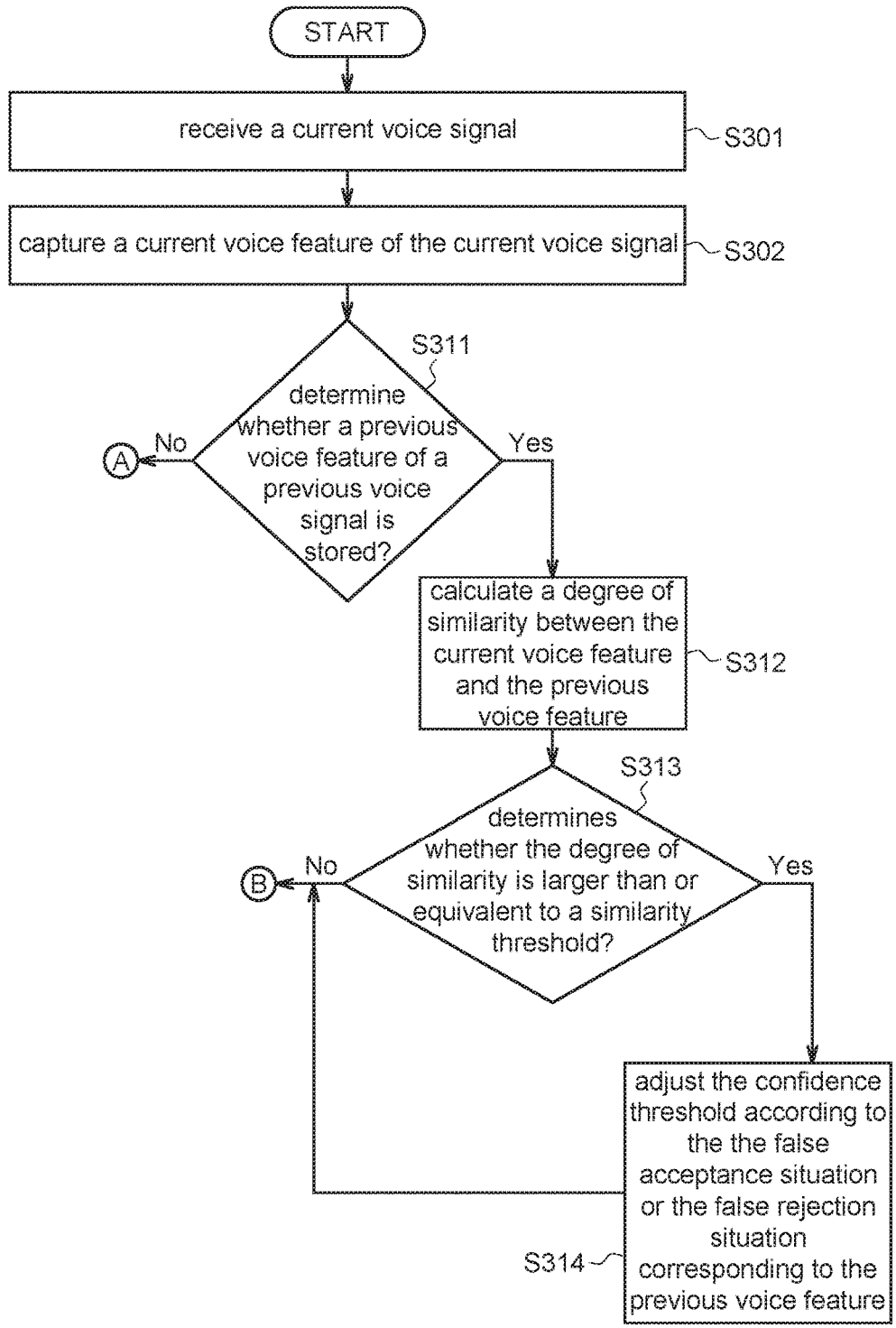
FIGS. 8A and 8B show a flowchart of a method for waking up an electronic apparatus using voice trigger according to another embodiment of the invention.
Figure 8B:
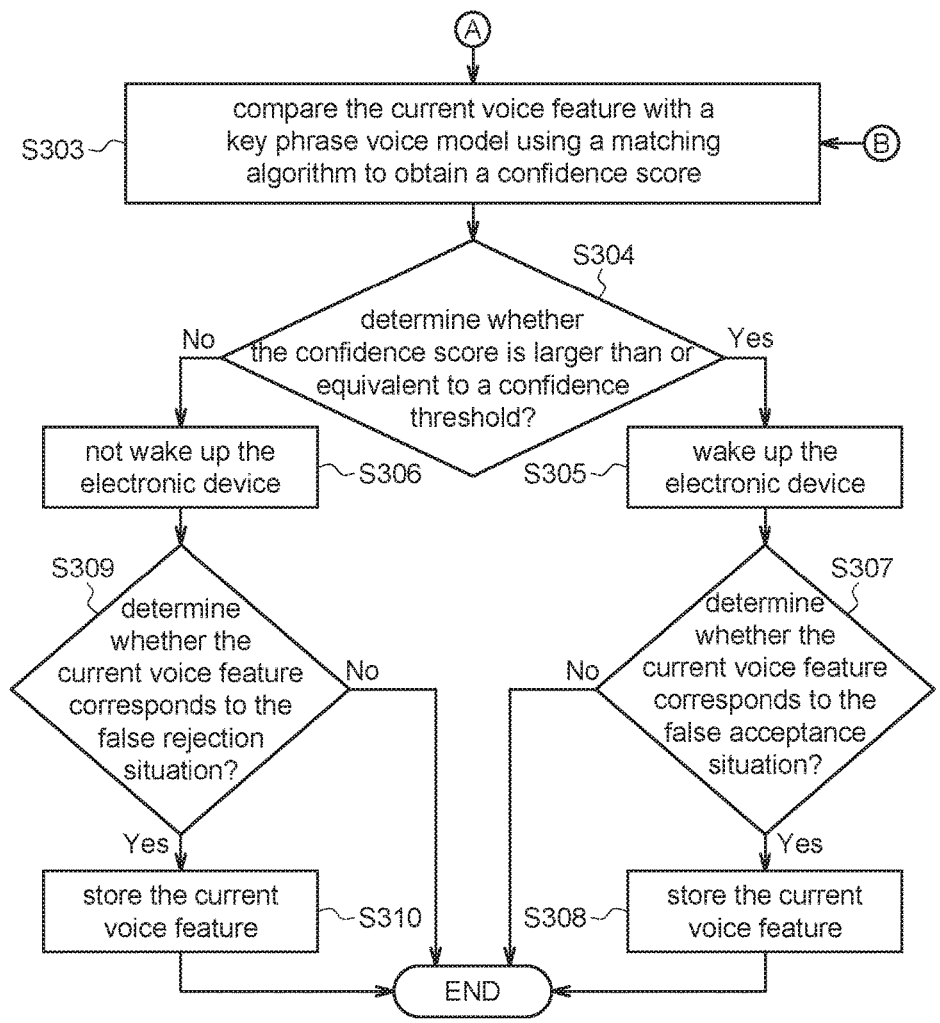

Referring to FIGS. 1, 6A, 6B, 8A and 8B. FIGS. 8A and 8B show a flowchart of a method for waking up an electronic apparatus 100 using voice trigger according to another embodiment of the invention. In the present embodiment, the processor 103 can adjust the confidence threshold according to the false acceptance situation or the false rejection situation corresponding to the previous voice feature.

Steps S301, S302, S311, S312 and S313 are similar to steps S201, S202, S211, S212 and S213 of FIG. 6A except that if the processor 103 determines that the degree of similarity between the current voice feature and the previous voice feature is larger than or equivalent to a similarity threshold (step S313), then the method proceeds to step S314. In step S314, the processor 103 adjusts the confidence threshold according to the false acceptance situation or the false rejection situation corresponding to the previous voice feature.

In step S314, if it is determined that the previous voice feature corresponds to the false acceptance situation and the degree of similarity between the current voice feature and the previous voice feature is larger than or equivalent to the similarity threshold (that is, the degree of similarity between the current voice feature and the previous voice feature is high), then the processor 103 increases the confidence threshold. If the previous voice feature corresponds to the false acceptance situation, this indicates that the user's previous speech content does not really want to wake up the electronic apparatus 100 but the electronic apparatus 100 is woken up by the user's previous speech content wakes. This is because when the confidence threshold is too low, the electronic apparatus 100 can be easily woken up by the voice feature. Therefore, the confidence threshold can be increased to reduce the frequency of false acceptance.

If it is determined that the previous voice feature corresponds to the false rejection situation and the degree of similarity between the current voice feature and the previous voice feature is larger than or equivalent to the similarity threshold (that is, the degree of similarity between the current voice feature and the previous voice feature is high), then the processor 103 lowers the confidence threshold. If the previous voice feature corresponds to the false rejection situation, this indicates that the user's previous speech content wants to wake up the electronic apparatus 100, but the electronic apparatus 100 cannot be successfully woken up. This is because when the confidence threshold is too high, the electronic apparatus 100 cannot be easily woken up by the voice feature. Therefore, the confidence threshold can be lowered to reduce the frequency of false rejection.

After step S314 is completed, the method proceeds to step S303. The processor 103 determines whether to wake up the electronic apparatus 100 according to the current voice feature and key phrase voice model. The process is disclosed below. In step S303, the processor 103 compares the current voice feature with the key phrase voice model to obtain a confidence score using a matching algorithm. Then, the method proceeds to step S304. The processor 103 determines whether to wake up the electronic apparatus 100 (step S305) or not to wake up the electronic apparatus 100 (step S306) according to whether the confidence score is larger than or equivalent to a confidence threshold (step S304). The processor 103 further determines whether the current voice feature corresponds to the false acceptance situation (step S307) or the false rejection situation (step S309). If it is determined that the current voice feature corresponds to the false acceptance situation or the false rejection situation, then the current voice feature is stored (step S308 or step S310).

In the present embodiment, if it is determined that the previous voice signal is stored in the storage device 101, then the processor 103 can adjust the confidence threshold according to the previous voice feature and the situation corresponding to the previous voice feature and the degree of similarity between the current voice feature. If the confidence threshold is increased, then the frequency of false acceptance will be decreased. If the confidence threshold is lowered, then the frequency of false rejection will be reduced. Thus, through the adjustment of confidence threshold, the frequency of false acceptance and false rejection can be effectively decreased, and the probability and accuracy of successfully waking up the electronic apparatus 100 under expected circumstances can be increased.

Figure 9:
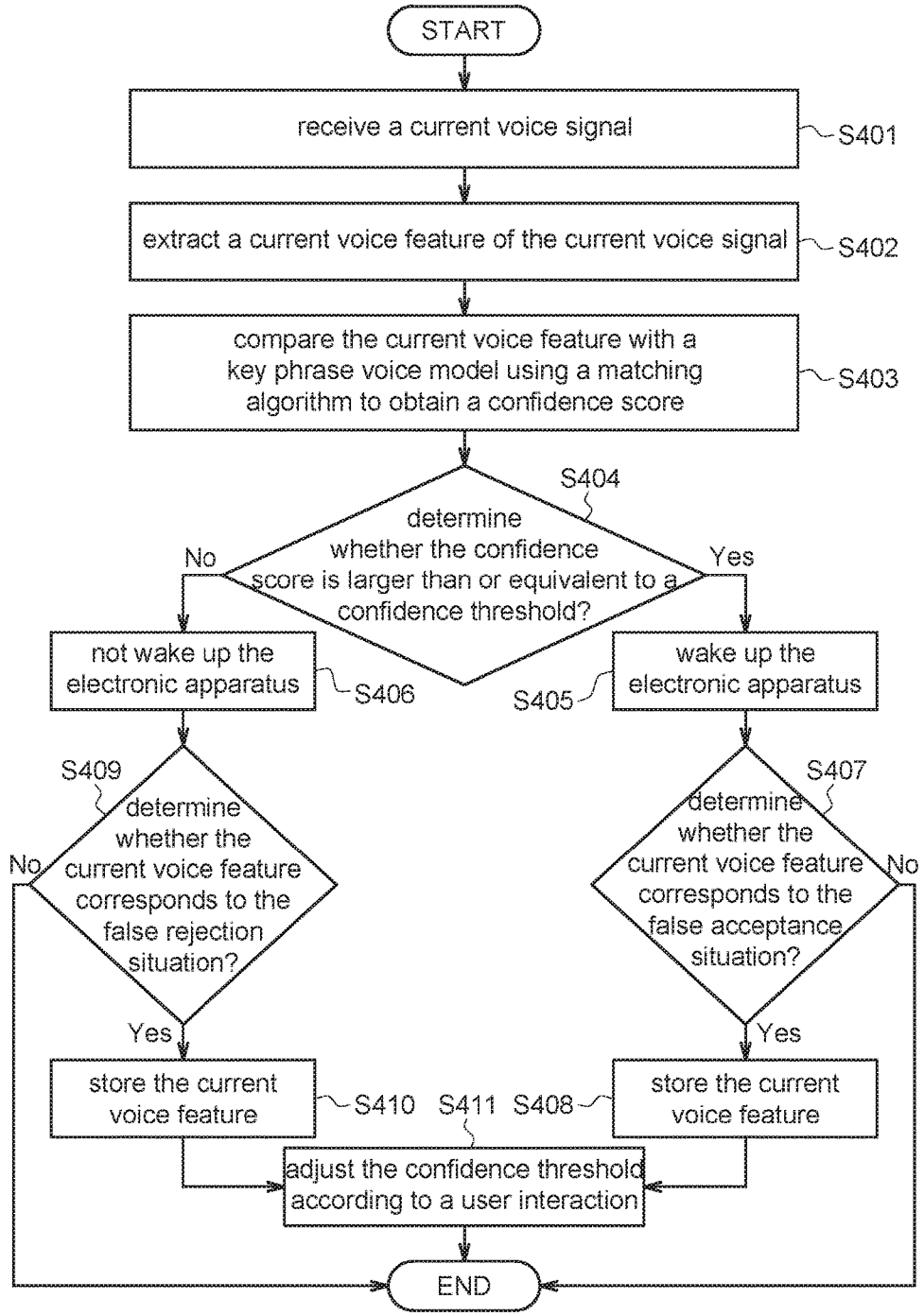
FIG. 9 is a flowchart of a method for waking up an electronic apparatus using voice trigger according to another embodiment of the invention.

Refer to FIGS. 1, 3 and 9. FIG. 9 is a flowchart of a method for waking up an electronic apparatus 100 using voice trigger according to another embodiment of the invention. In the present embodiment, the processor 103 can adjust the confidence threshold according to the user interaction. Steps S401—S410 are similar to steps S101—S110 of FIG. 3 except that after the processor 103 determines that the current voice feature corresponds to the false acceptance situation and stores the current voice feature to the storage device 101 (step S407 and S408) or determines that the current voice feature corresponds to the false rejection situation and stores the current voice feature to the storage device 101 (step S409 and S410), the method proceeds to step S411. In step S411, the processor 103 adjusts the confidence threshold according to a user interaction. For example, the processor 103 can determine whether the electronic apparatus 100 is immediately turned off by the user each time after the electronic apparatus 100 is woken up (that is, a false acceptance situation). Or, the processor 103 can determine whether the electronic apparatus 100 cannot be successfully woken up by the user's speech content each time when the user wants to wake up the electronic apparatus 100 using the same speech content (that is, the false rejection situation). If the above situations occur consecutively, this indicates that the confidence threshold could be either too high or too low, and the processor 103 can determine whether to adjust the confidence threshold according to whether the frequency of consecutive situations is too high.

Specifically, the processor 103 determines whether to adjust the confidence threshold according to whether the frequency of consecutive false acceptance or false rejection is larger than a frequency threshold. The frequency threshold can be defined by the designer. If it is determined that the frequency of consecutive false acceptance is larger than the frequency threshold, this indicates that the confidence threshold is too low, and the electronic apparatus 100 can be easily woken up by the voice feature. Under such circumstances, the processor 103 can increase the confidence threshold to lower the frequency of false acceptance. If it is determined that the frequency of consecutive false rejection is larger than the frequency threshold, this indicates that the confidence threshold is too high, and the electronic apparatus 100 cannot be easily woken up by the voice feature. Under such circumstances, the processor 103 can lower the confidence threshold to reduce the frequency of false rejection.

Thus, the processor 103 can adjust the confidence threshold according to a user interaction to reduce the frequency of false acceptance or false rejection.

Figure 10A:
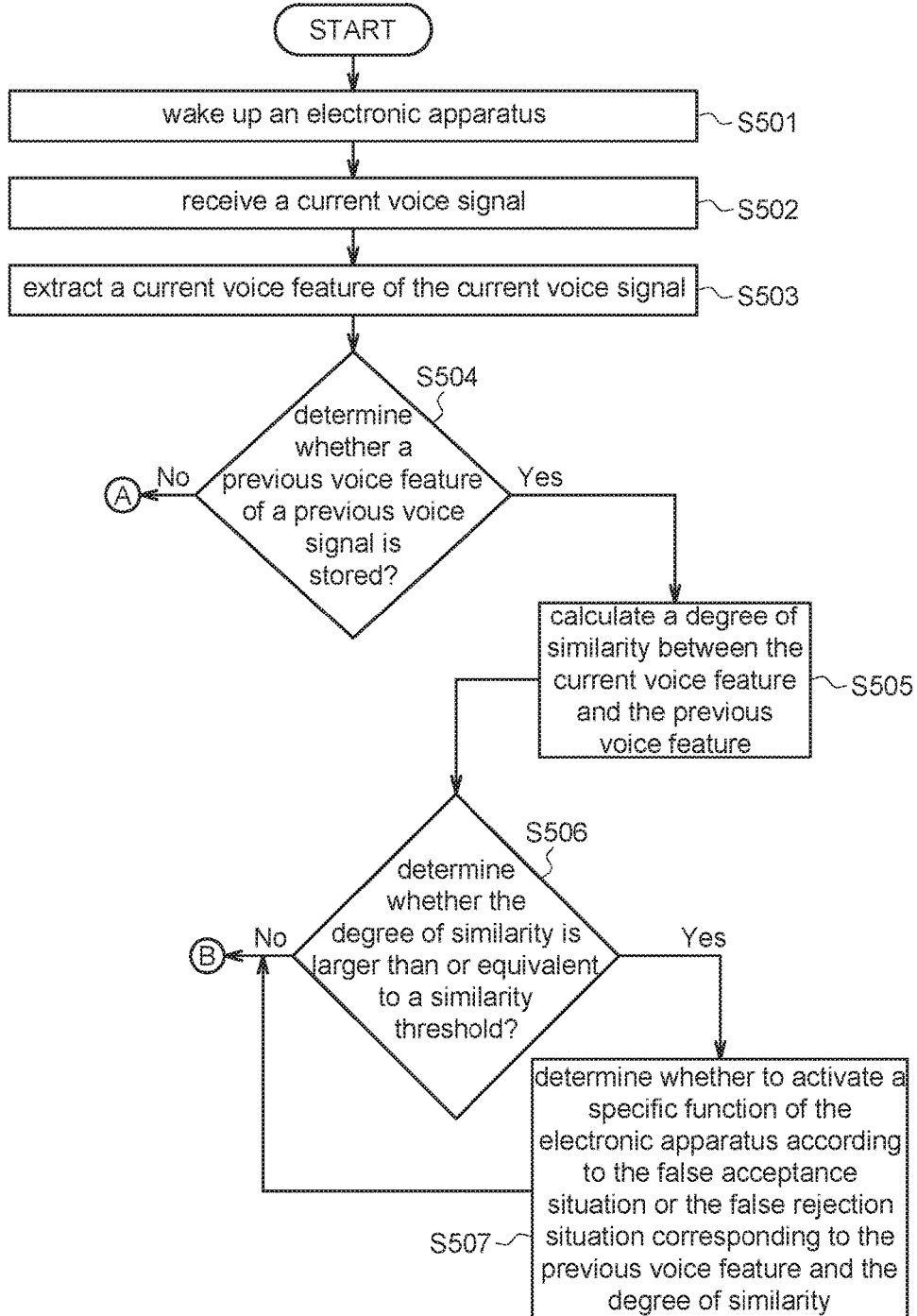
FIGS. 10A and 10B show a flowchart of a method for activating a specific function of an electronic apparatus using voice trigger according to another embodiment of the invention.
Figure 10B:
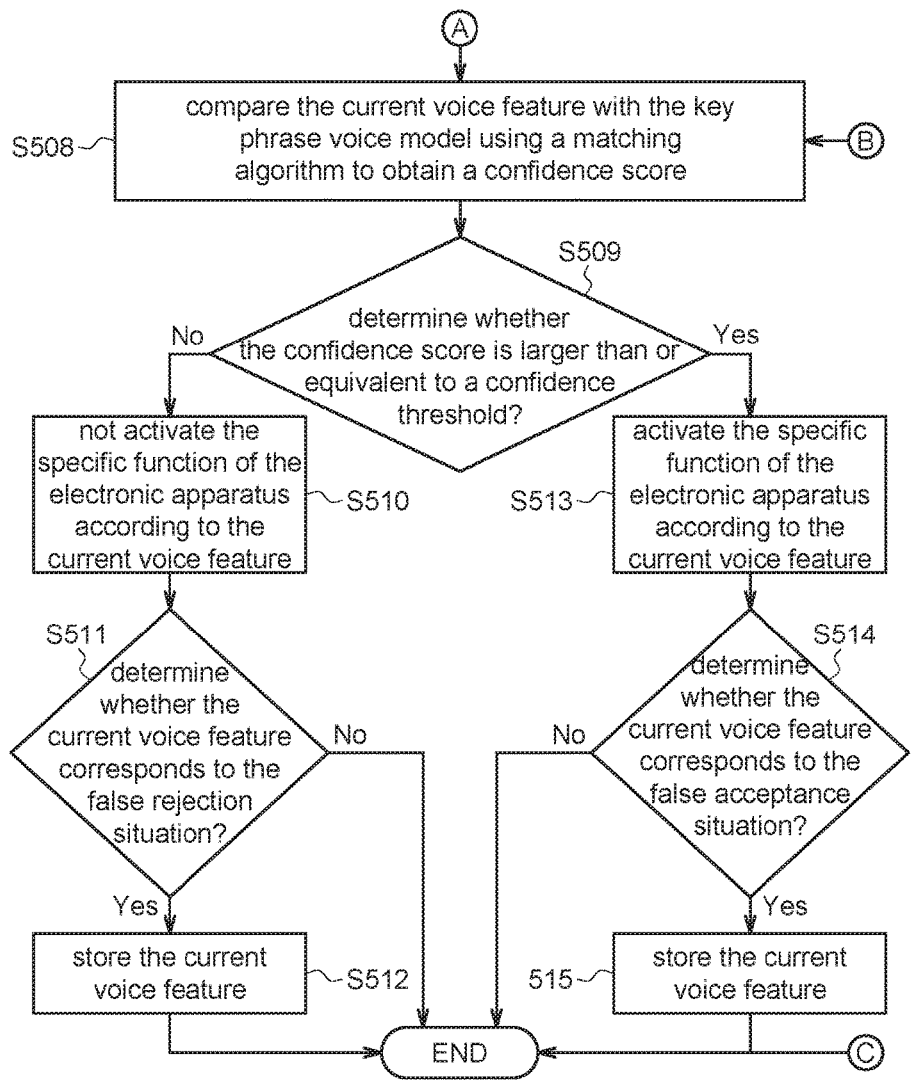

Refer to FIGS. 1 and 10A and 10B. FIGS. 10A and 10B show a flowchart of a method for activating a specific function of an electronic apparatus 100 using voice trigger according to another embodiment of the invention. In the present embodiment, after the electronic apparatus 100 is woken up, the processor 103 further activates a specific function of the electronic apparatus 100 using voice trigger. That is, the voice receiver 102 receives a current voice signal after the electronic apparatus 100 is woken up. Then, the processor 103 further determines whether a previous voice feature of a previous voice signal is stored in the storage device 101. If it is determined that the previous voice feature of the previous voice signal is stored in the storage device 101, then the processor 103 determines whether to activate a specific function of the electronic apparatus 100 according to the previous voice feature. If it is determined that the previous voice feature of the previous voice signal is not stored in the storage device 101, then the processor 103 determines whether to activate a specific function of the electronic apparatus 100 according to the current voice feature.

In step S501, an electronic apparatus 100 is woken up. In an embodiment, the user wakes up the electronic apparatus 100 by pressing a keypad or touching a touch screen. In another embodiment, the method by which the user wakes up the electronic apparatus 100 using voice is the same as the method disclosed above and the similarities are not repeated here.

In step S502, the voice receiver 102 receives a current voice signal. The user can activate a specific function of the electronic apparatus 100 by uttering a specific voice command. For example, the specific voice command at least includes one of "Pairing", "Check battery" and "Am I connected". The current voice signal is the voice signal corresponding to the specific voice command uttered by the user. In step S503, the processor 103 extracts a current voice feature of the current voice signal.

Then, the method proceeds to step S504, the processor 103 determines whether a previous voice feature of a previous voice signal is stored in the storage device 101. If it is determined that the previous voice signal is stored in the storage device 101, then the method proceeds to step S505. If it is determined that the previous voice signal is not stored in the storage device 101, then the method proceeds to step S508.

In step S505, the processor 103 calculates a degree of similarity between the current voice feature and the previous voice feature. After the degree of similarity is calculated, the method proceeds to step S506. In step S506, the processor 103 determines whether the degree of similarity between the current voice feature and the previous voice feature is larger than or equivalent to a similarity threshold. If it is determined that the degree of similarity is larger than or equivalent to the similarity threshold, then the method proceeds to step S507. If it is determined that the degree of similarity is smaller than the similarity threshold, then the method proceeds to step S508.

In step S507, the processor 103 determines whether to activate a specific function of the electronic apparatus 100 according to the false acceptance situation or the false rejection situation corresponding to the previous voice feature and the degree of similarity. If it is determined that the previous voice feature corresponds to the false acceptance situation and the similarity between the current voice feature and the previous voice feature is larger than or equivalent to the similarity threshold, then the processor 103 does not activate a specific function of the electronic apparatus 100. If it is determined that the previous voice feature corresponds to the false acceptance situation, this indicates that a specific function of the electronic apparatus 100 is activated by the user's previous speech content when the user's previous speech content does not really want to activate it. If it is determined that the previous voice feature corresponds to the false acceptance situation and the user's current speech content is similar to his/her previous speech content, then the processor 103 can determine that the user currently does not really want to activate the specific function of the electronic apparatus 100, and therefore does not activate it. If it is determined that the previous voice feature corresponds to the false rejection situation and the similarity between the current voice feature and the previous voice feature is larger than or equivalent to the similarity threshold, then the processor 103 activates the specific function of the electronic apparatus 100. If it is determined that the previous voice feature corresponds to the false rejection situation, this indicates that the user's previous speech content really wants to activate the specific function of the electronic apparatus 100 but fails. Therefore, if it is determined that the previous voice feature corresponds to the false rejection situation and the user's current speech content is similar to his/her previous speech content, then the processor 103 can determine that the user currently wants to activate the specific function of the electronic apparatus 100, and therefore activates it. For example, if the specific voice command corresponding to the current voice feature is "Pairing", the previous voice feature corresponds to the false rejection situation and the similarity between the current voice feature and the previous voice feature is larger than or equivalent to the similarity threshold, then the processor 103 activates the function of confirming whether the pairing of wireless communication between the electronic apparatus 100 and other electronic apparatus is successful according to the current voice feature.

In step S508, the processor 103 compares the current voice feature with the key phrase voice model using a matching algorithm to obtain a confidence score. That is, if it is determined that the previous voice signal is not stored in the storage device 101 or the degree of similarity between the current voice feature and the previous voice feature is low, then the processor 103 does not needs to determine whether to activate a specific function of the electronic apparatus 100 according to the previous voice feature. The processor 103 compares the current voice feature with the key phrase voice model to determine whether to activate the specific function of the electronic apparatus 100 according to the current voice feature.

After the confidence score is obtained in step S508, the method proceeds to step S509. In step S509, the processor 103 determines whether the confidence score is larger than or equivalent to a confidence threshold. If it is determined that the confidence score is larger than or equivalent to the confidence threshold, then the method proceeds to S513. If it is determined that the confidence score is smaller than the confidence threshold, then the method proceeds to S510.

In step S513, the processor 103 feature activates a specific function of the electronic apparatus 100 according to the current voice. For example, the processor 103, according to the current voice feature, activates at least one of the following functions, that is, the function of confirming whether the pairing of wireless communication between the electronic apparatus 100 and other electronic apparatus is successful, the function of checking the battery capacity of the electronic apparatus 100 and the function of checking whether the electronic apparatus 100 is connected to the Internet. Furthermore, if the specific voice command corresponding to the current voice feature received by the voice receiver 102 is "Pairing", then the processor 103 activates the function of confirming whether the pairing of wireless communication between the electronic apparatus 100 and other electronic apparatus is successful according to the current voice feature. If the specific voice command corresponding to the current voice feature received by the voice receiver 102 is "Check battery", then the processor 103 activates the function of checking the battery capacity of the electronic apparatus 100 according to the current voice feature. If the specific voice command corresponding to the current voice feature received by the voice receiver 102 is "Am I connected", then the processor 103 activates the function of checking whether the electronic apparatus 100 is connected to the Internet according to the current voice feature.

Then, the method proceeds to step S514. In step S514, the processor 103 determines whether the current voice feature corresponds to the false acceptance situation. False acceptance refers to the situation that the processor 103 activates a specific function of the electronic apparatus 100 unexpectedly. The determination method includes: determining whether the user turns off the specific function within a specific time after the processor 103 activates a specific function of the electronic apparatus 100 according to the current voice feature. If the user turns off the specific function within a specific time, this indicates that the specific function is activated by the current voice feature when the user does not really want to activate the specific function. Therefore, it can be determined that the activation of the specific function is the false acceptance situation. Then, the method proceeds to step S515. In step S515, the processor 103 stores the current voice feature to the storage device 101 and records that the current voice feature corresponds to the false acceptance situation.

In step S510, the processor 103 does not activate the specific function of the electronic apparatus 100 according to the current voice feature. Then, the method proceeds to step S511. In step S511, the processor 103 determines whether the current voice feature corresponds to the false rejection situation. False rejection refers to the situation that the user wants to activate a specific function of the electronic apparatus 100 using the current voice but the specific function cannot be successfully activated. The determination method includes: determining whether the specific function of the electronic apparatus 100 is not activated by the current voice feature, whether the confidence score obtained from the comparison between the current voice feature and the key phrase voice model is smaller than a confidence threshold and whether the difference between the confidence score and the confidence threshold is within a predetermined range. If it is determined that the confidence score is smaller than the confidence threshold and the difference between the confidence score and the confidence threshold is within the predetermined range (that is, the confidence score is very close to the confidence threshold), this indicates that the user really wants to activate the specific function of the electronic apparatus 100 using the current voice but the specific function of the electronic apparatus 100 cannot be activated by the current voice feature. Therefore, it can be determined that the false rejection situation occurs. Then, the method proceeds to step S512. In step S512, the processor 103 stores the current voice feature to the storage device 101 and records that the current voice feature corresponds to the false rejection situation.

In the present embodiment, voice trigger can be used for activating a specific function of the electronic apparatus 100. After the electronic apparatus 100 is woken up, the user can activate a specific function of the electronic apparatus 100 using voice trigger. The processor 103 can activate the specific function of the electronic apparatus 100 according to the current voice feature, and can record whether the specific function is activated by the current voice feature due to false acceptance or the specific function cannot be activated by the specific function due to false rejection. Therefore, when the electronic apparatus 100 receives the user's next voice, if the user's previous voice feature is already stored in a storage device, then the processor 103 can determine whether to activate a specific function of the electronic apparatus 100 according to the similarity between the voice feature of the user's next voice and the stored voice feature without using the key phrase voice model. Therefore, the efficiency of activating a specific function of the electronic apparatus 100 using voice can be increased.

A method for waking up an electronic apparatus using voice trigger is disclosed in above embodiments of the invention. If the previous voice signal is stored in a storage device, whether to wake up the electronic apparatus can be determined according to the false acceptance situation or the false rejection situation corresponding to the previous voice feature and the degree of similarity between the current voice feature and the previous voice feature. Thus, the efficiency of waking up the electronic apparatus can be increased. Also, the confidence threshold can be adjusted to decrease the frequency of false acceptance or false rejection according to the false acceptance situation or the false rejection situation corresponding to the previous voice feature and the degree of similarity between the current voice feature and the previous voice feature. The frequency of false acceptance or false rejection can be decreased without performing on-line adaptation of the key phrase voice model or pre-training of the key phrase voice model. Therefore, the adjustment only involves a low degree of complexity, and can effectively reduce the frequency of false acceptance or false rejection to increase the probability and accuracy of waking up the electronic apparatus.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for waking up an electronic apparatus using voice trigger, comprising:
   receiving a current voice signal;
   extracting a current voice feature of the current voice signal;
   determining whether a previous voice feature of a previous voice signal is stored;
   wherein if it is determined that the previous voice feature is stored and a degree of similarity between the current voice feature and the previous voice feature is larger than or equivalent to a similarity threshold,
   (A) adjusting a confidence threshold according to a false acceptance situation or a false rejection situation corresponding to the previous voice feature, or
   (B) determining whether to wake up the electronic apparatus according to the false acceptance situation or the false rejection situation corresponding to the previous voice feature;
   wherein if it is determined that the previous voice feature of the previous voice signal is not stored, then the method further comprises:
   comparing the current voice feature with a key phrase voice model using a matching algorithm to obtain a confidence score;
   determining whether the confidence score is larger than or equivalent to the confidence threshold;
   waking up the electronic apparatus if the confidence score is larger than or equivalent to the confidence threshold; and
   not waking up the electronic apparatus if the confidence score is smaller than the confidence threshold;
   wherein after waking up the electronic apparatus, the method further comprises:
   (1) determining whether the current voice feature corresponds to the false acceptance situation according to a user interaction and range of confidence score;
   (2) if it is determined that the current voice feature corresponds to the false acceptance situation, then the current voice feature is stored and the confidence threshold is adjusted according to the user interaction;
   wherein the user interaction comprises a frequency of consecutive false acceptance, and the step of adjusting the confidence threshold according to the user interaction comprises:
   (1) determining whether the frequency of consecutive false acceptance is larger than a frequency threshold; and
   (2) increasing the confidence threshold if the frequency of consecutive false acceptance is larger than the frequency threshold.

2. The method according to claim 1, wherein if it is determined that the previous voice feature corresponds to the false acceptance situation and the degree of similarity is larger than or equivalent to the similarity threshold, then the confidence threshold is increased or the electronic apparatus is not woken up.

3. The method according to claim 1, wherein if it is determined that the previous voice feature corresponds to the false rejection situation and the degree of similarity is larger than or equivalent to the similarity threshold, then the confidence threshold is lowered or the electronic apparatus is woken up.

4. The method according to claim 1, wherein after not waking up the electronic apparatus, the method further comprises:
   determining whether the current voice feature corresponds to a false rejection situation according to the user interaction and range of confidence score;
   wherein if it is determined that the current voice feature corresponds to the false rejection situation, then the current voice feature is stored and the confidence threshold is adjusted according to the user interaction.

5. The method according to claim 4, herein the user interaction comprises a frequency of consecutive false rejection, and the step of adjusting the confidence threshold according to the user interaction comprises:
   determining whether the frequency of consecutive false rejection is larger than the frequency threshold;
   lowering the confidence threshold if the frequency of consecutive false rejection is larger than the frequency threshold.

6. An electronic apparatus, comprising:
   a storage device;
   an voice receiver used for receiving a current voice signal;
   a processor used for extracting a current voice feature of the current voice signal and determining whether a previous voice feature of a previous voice signal is stored in the storage device;
   wherein if it is determined that the previous voice feature is stored in the storage device and a degree of similarity between the current voice feature and the previous voice feature is larger than or equivalent to a similarity threshold, then
   (A) the processor adjusts a confidence threshold according to a false acceptance situation or a false rejection situation corresponding to the previous voice feature, or
   (B) the processor determines whether to wake up the electronic apparatus according to the false acceptance situation or the false rejection situation corresponding to the previous voice feature;
   wherein if it is determined that the previous voice feature of the previous voice signal is not stored, then
   (1) the processor compares the current voice feature with a key phrase voice model using a matching algorithm to obtain a confidence score and further determines whether the confidence score is larger than or equivalent to the confidence threshold;
   (2) the processor wakes up the electronic apparatus if the confidence score is larger than or equivalent to the confidence threshold, but does not wake up the electronic apparatus if the confidence score is smaller than the confidence threshold;
   wherein after waking up the electronic apparatus, the processor further determines whether the current voice feature corresponds to the false acceptance situation according to a user interaction and range of confidence score; if it is determined that the current voice feature corresponds to the false acceptance situation, then the processor stores the current voice feature to the storage device and adjusts the confidence threshold according to the user interaction;
   wherein the user interaction comprises a frequency of consecutive false acceptance, the processor further determines whether the frequency of consecutive false acceptance is larger than a frequency threshold; the confidence threshold is increased if it is determined that the frequency of consecutive false acceptance is larger than the frequency threshold.

7. The electronic apparatus according to claim 6, wherein the processor increases the confidence threshold or does not wake up the electronic apparatus if it is determined that the previous voice feature corresponds to the false acceptance situation and the degree of similarity is larger than or equivalent to the similarity threshold.

8. The electronic apparatus according to claim 6, wherein the processor decrease the confidence threshold or wakes up the electronic apparatus if it is determined that the previous voice feature corresponds to the false rejection situation and the degree of similarity is larger than or equivalent to the similarity threshold.

9. The electronic apparatus according to claim 6, wherein after not waking up the electronic apparatus, the processor further determines whether the current voice feature corresponds to a false rejection situation according to the user interaction and range of confidence score; if it is determined that the current voice feature corresponds to the false rejection situation, then the processor stores the current voice feature to the storage device and adjusts the confidence threshold according to the user interaction.

10. The electronic apparatus according to claim 9, wherein the user interaction comprises a frequency of consecutive false rejection, the processor further determines whether the frequency of consecutive false rejection is larger than the frequency threshold; the confidence threshold is lowered if it is determined that the frequency of consecutive false rejection is larger than the frequency threshold.

* * * * *